US00RE37326B1

(19) United States
(12) Reissued Patent
Kim

(10) Patent Number: US RE37,326 E
(45) Date of Reissued Patent: Aug. 14, 2001

(54) HDTV RECEIVER

(75) Inventor: Dae Jin Kim, Kwangju (KR)

(73) Assignee: LG Electronics (KR)

(21) Appl. No.: 09/121,090

(22) Filed: Jul. 23, 1998

Related U.S. Patent Documents

Reissue of:
(64) Patent No.: 5,570,136
Issued: Oct. 29, 1996
Appl. No.: 08/421,438
Filed: Apr. 12, 1995

(30) Foreign Application Priority Data

Apr. 12, 1994 (KR) ..... 7637/1994

(51) Int. Cl.[7] ..... H04N 5/46; H04N 5/44
(52) U.S. Cl. ..... 348/725; 348/726; 348/735; 455/182.1
(58) Field of Search ..... 348/726, 727, 348/725, 638, 505, 735, 731; 455/304, 308, 340, 266, 295, 337, 309, 182.1, 182.2, 296, 63; H04N 5/46, 5/44

(56) References Cited

U.S. PATENT DOCUMENTS 5,087,975 * 2/1992 Citta et al. ..... 358/183
5,177,611 * 1/1993 Gibson et al. ..... 358/167
5,272,534 * 12/1993 Vromans et al. ..... 455/257
5,283,653 * 2/1994 Citta ..... 348/725
5,410,368 * 4/1995 Krishnamurthy et al. ..... 348/726
5,452,015 * 9/1995 Hulyalkar ..... 348/608
5,825,242 * 10/1998 Prodan et al. ..... 375/321

* cited by examiner

*Primary Examiner*—Michael Lee
(74) *Attorney, Agent, or Firm*—Long, Aldridge & Norman LLP

(57) ABSTRACT

An HDTV receiver is disclosed including a tuning portion for selecting one of a plurality of RF signals received, and converting a selected RF signal into an intermediate frequency signal; a demodulator/FPLL for demodulating the intermediate frequency signal output from the tuning portion into a baseband signal in which the frequency and phase are locked, and outputting an AFC signal; a first local oscillator for forming a frequency signal which can be varied from a reference frequency to a specific frequency, and outputting the thus-formed frequency signal to the demodulator/FPLL; and a VSB filter for VSB-filtering the baseband signal output from the demodulator/FPLL.

51 Claims, 4 Drawing Sheets

HDTV RECEIVER

Matter enclosed in heavy brackets [ ] appears in the original patent but forms no part of this reissue specification; matter printed in italics indicates the additions made by reissue.

BACKGROUND OF THE INVENTION

The present invention relates to a high-definition television (HDTV) receiver, and more particularly, to an HDTV receiver using a vestigial sideband filter implemented with a finite impulse response (FIR) filter.

FIG. 1 is a block diagram of a conventional HDTV, showing the configuration of HDTV receiver proposed by Grand Alliance.

The conventional HDTV receiver of FIG. 1 comprises a tuner 1, SAW filter 3, IF amplifier 4, local oscillators 2 and 5, demodulator/frequency phase locked loop (FPLL) 6, and an ADC 7.

The operation of the conventional HDTV receiver will be discussed below.

A signal transmitted through an antenna is first and second demodulated in tuner 1. Specifically, the signal input through the antenna is band-pass-filtered in band of 50–800 MHz, and then amplified. The signal of 50–800 MHz output from a BPF/amplifier is multiplied by the frequency signal of 0.97–1.72 GHz output from local oscillator 1b in a mixer 1c for the purpose of first demodulation. Here, local oscillator 1b selects the frequency of an intended channel by a channel tuning signal.

The signal demodulated and output from mixer 1c is band-pass-filtered and amplified to 920 MHz in a BPF/amplifier/AGC 1d. The gain of the amplified signal is automatically controlled under the instruction of a delayed AGC.

In mixer 1e, the signal output from BPF/amplifier/AGC 1d is multiplied by the frequency signal output from local oscillator 2 and whose central frequency is 876 MHz. The local oscillator is a VCO in which 876 MHz is the central frequency. The multiplied signal is output, with its intermediate frequency being 44 MHz. The output signal of mixer 1e is gain-controlled and amplified in IF amplifier 1f. The signal output from IF amplifier 1f is VSB-filtered in SAW filter 3.

Speaking of the transmission/reception terminals of the HDTV in which a signal is transmitted in VSB, a transmission function for the overall transmission/reception must be raised-cosine in a transmission band in which a pilot signal is present, in order not to produce inter-symbol interference.

On the transmission terminal of HDTV, a square root raised cosine (SRC) VSB filter is used. Accordingly, the SRC filter must be also used on the reception terminal of HDTV.

FIG. 2 is a frequency characteristic diagram of an SRC-type VSB filter.

Referring to FIG. 2, an SRC-type VSB filter becomes a transmission channel free from inter-symbol interference because the SRC of the transmission terminal and the SRC of the reception terminal are multiplied to become a RC filter.

In other words, the RC filter is made by multiplying the transmission filter by the reception filter. Here, the transmission filter and the reception filter are the same, becoming the SRC filter.

This can be given in the following equation.

RC filter=transmission filter×reception filter transmission filter=reception filter=$\overline{\text{RC filter}}$=SRC filter The conventional VSB filter for HDTV is realized with a SAW filter 3. The frequency characteristic of SAW filter 3 is as shown in FIG. 2.

The signal VSB-filtered through SAW filter 3 receives an AGC signal from IF amplifier 4 so as to be gain-controlled automatically. The gain-controlled signal is demodulated to a baseband in demodulator/FPLL 6 so that its frequency and phase are locked.

Here, the FPLL forms two loops. One loop formed with a mixer 6a, AFC LPF 6d, amplifier limiter 6e, APC LPF 6f, and local oscillator 2 is to lock frequency. The other loop formed with a mixer 6c, APC LPF 6f and local oscillator 2 is to lock phase when the frequency is locked and only "1" is output from amplifier limiter 6e. Here, local oscillator 5 generates a single frequency of 46.69 MHz with a reference oscillator. The single frequency is output to mixer 6c and a phase converter 6b for performing 900 phase conversion.

The signal passing through demodulator/FPLL 6 is digitally converted in ADC 7 at 10.76 MHz of the symbol rate.

In the conventional HDTV receiver, since the AFC signal output from demodulator/FPLL 6 controls local oscillator 2, the loop is elongated to make the system unstable.

In addition, since the VSB filter of the conventional HDTV is constructed with a SAW filter, roll-off factor $\alpha$, the ratio of transmission band to pass band, is given as follows.

$$\alpha = \frac{\text{transmission band}}{\text{pass band}} = \frac{2B}{2A} = \frac{B}{A} = 0.115$$

As shown in this equation, the factor is so small as to require large number of taps, complicating the configuration of the SAW filter and reducing economical efficiency.

SUMMARY OF THE INVENTION

Therefore, it is an object of the present invention to provide an HDTV receiver in which a VSB filter is made with an FIR filter to increase the roll-off factor of a SAW filter and to thereby use a filter of fewer number of taps, and in which a loop formed by a demodulator/FPLL is shortened.

To accomplish the object of the present invention, there is provided an HDTV receiver comprising: a tuning portion for selecting one of a plurality of RF signals received, and converting a selected RF signal into an intermediate frequency signal; a demodulator/FPLL for demodulating the intermediate frequency signal output from the tuning portion into a baseband signal in which the frequency and phase are locked, and outputting an AFC signal; a first local oscillator for forming a frequency signal which can be varied from a reference frequency to a specific frequency, and outputting the thus-formed frequency signal to the demodulator/FPLL; and a VSB filter for VSB-filtering the baseband signal output from the demodulator/FPLL.

BRIEF DESCRIPTION OF THE ATTACHED DRAWINGS

DETAILED DESCRIPTION OF THE INVENTION

Figure 1:
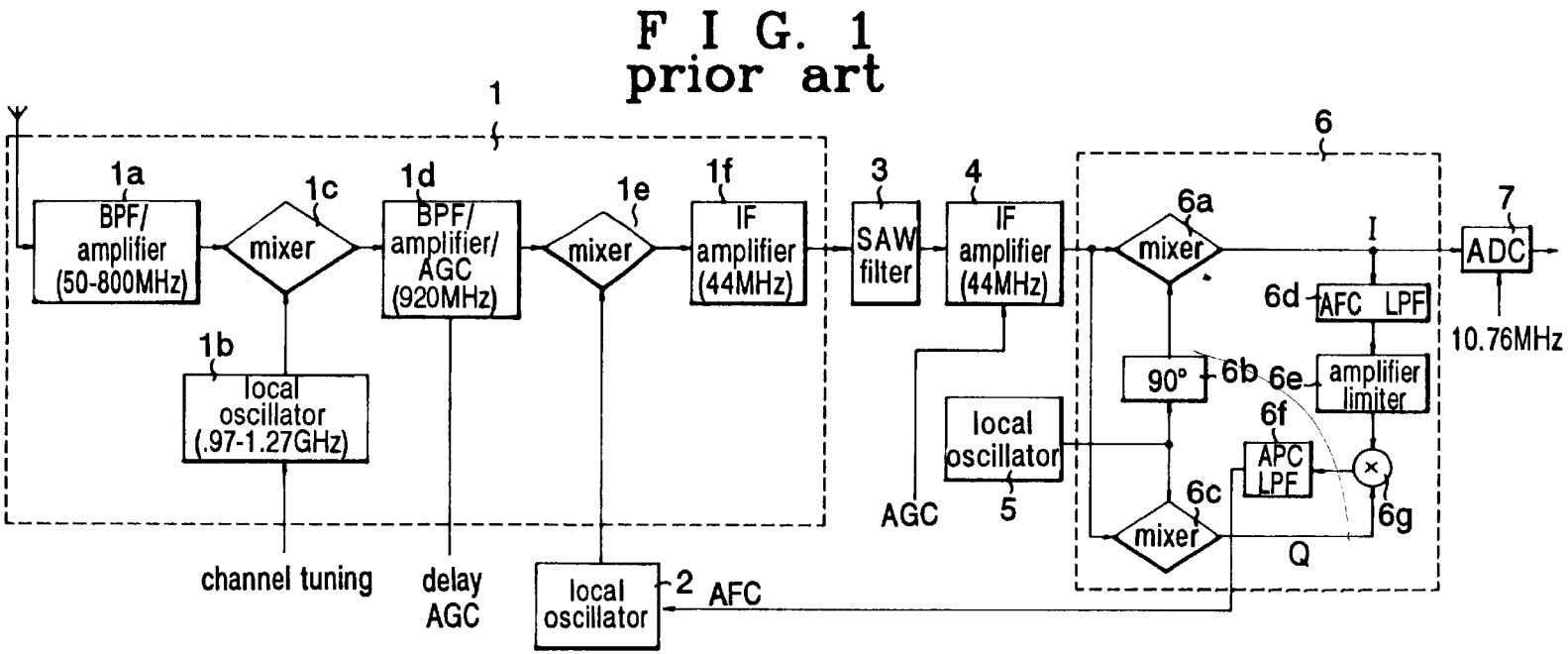
FIG. 1 prior art
FIG. 1 is a block diagram of a conventional HDTV receiver.
Figure 2:
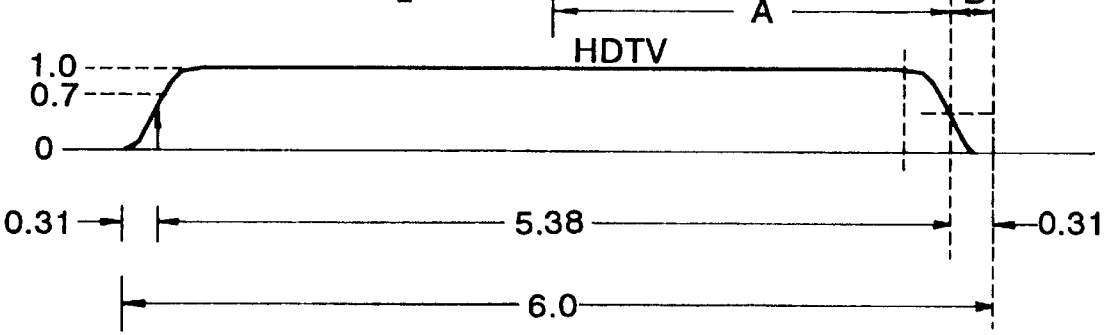
FIG. 2 prior art
FIG. 2 is a frequency characteristic diagram of a conventional SRC-type VSB.
Figure 3:
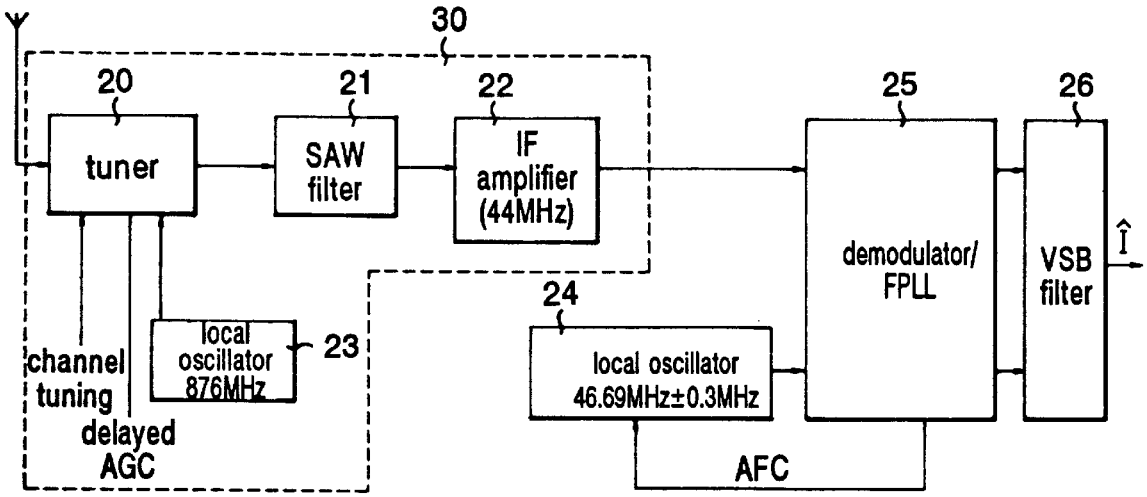
FIG. 3 is a block diagram of an HDTV of the present invention.

Referring to FIG. 3, an HDTV receiver of the present invention is made up of a tuning portion 30, demodulator/FPLL 25, local oscillator 24, and VSB filter 26.

Tuning portion 30 comprises a local oscillator 23 for outputting a frequency signal fixed at 876 MHz, a tuner 20 for first demodulating one of a plurality of RF signals received according to an input channel tuning signal and a delayed AGC signal, and second demodulating the first demodulated RF signal according to a frequency signal output from local oscillator 23, a SAW filter 21 for band-rejection-filtering a baseband signal output from tuner 20, and an IF amplifier 22 for automatically gain-controlling a baseband signal output from SAW filter 21. The tuning portion selects one of a plurality of RF signals received, and converts a selected RF signal into an intermediate frequency signal.

Here, SAW filter 21 is to band-rejection-filter the baseband signal output from tuner 20 through a frequency band containing a guard band with the transmission band of the VSB filter. In other words, SAW filter 21 band-rejection-filters the baseband signal output from tuner 20 through 6 MHz±300 KHz.

Demodulator/FPLL 25 demodulates the intermediate frequency signal output from IF amplifier 22 of tuning portion 30 into a baseband signal in which the frequency and phase are locked, and outputs an AFC signal.

Local oscillator 24 forms a frequency signal which can be varied from a 46.69 MHz reference frequency to a specific frequency of±300 KHz, and outputs the thus-formed frequency signal to demodulator/FPLL 25.

Figure 4:
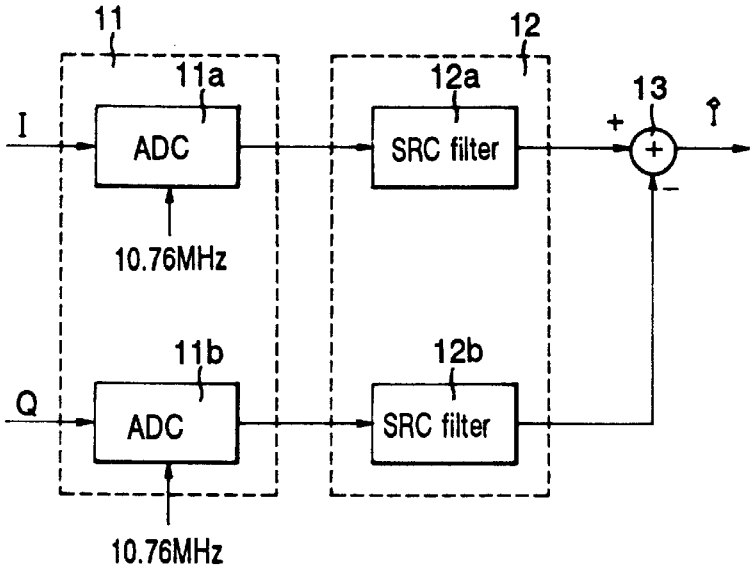
FIG. 4 is a detailed block diagram of the VSB filter of FIG. 3.

VSB filter 26 VSB-filters the baseband signal output from demodulator/FPLL 25. As shown in FIG. 4, VSB filter 26 comprises an ADC portion 11 for A/D converting the baseband signal output from demodulator/FPLL 25 by dividing it into I-channel and Q-channel signals, an SRC filter portion 12 for SRC-filtering the I-channel and Q-channel signals output from ADC portion 11, and a subtractor 13 for subtracting a signal output from SRC filter portion 12 and outputting a VSB-filtered signal Î.

Here, ADC portion 11 consists of two ADCs 11a and 11b for A/D converting the I-channel and Q-channel signals, respectively. SRC filter portion 12 comprises an SRC filter 12a for SRC-filtering the I-channel signal output from ADC 11a of ADC portion 11 with the coefficient of the real-number axis, and an SRC filter 12b for SRC-filtering the Q-channel signal output from ADC 11b of ADC portion 11 with the coefficient of the imaginary-number axis.

ADCs 11a and 11b establish their sampling frequency at 10.76 MHz, which is the symbol rate.

The operation of the HDTV receiver constructed as above will be explained with reference to FIGS. 5A, 5B, 6A and 6B.

First, local oscillator 23 generates an 876 MHz frequency signal and outputs it to tuner 20. One of a plurality of RF signals received via an antenna is selected and first demodulated according to an input channel tuning signal and delayed AGC signal. The first demodulated RF signal is second demodulated according to the 876 MHz frequency signal output from local oscillator 23.

The baseband signal demodulated in tuner 20 is band-rejection-filtered via SAW filter 21, and automatically gain-controlled by receiving an AGC signal input from IF amplifier 22. The gain-controlled signal is demodulated into a baseband in demodulator/FPLL 25 so that the frequency and phase are locked.

Here, local oscillator 24 receives an AFC signal from demodulator/FPLL 25, and forms a frequency signal which can be varied from the 46.69 MHz reference frequency to±300 KHz according to the voltage of the AFC signal. The thus-formed frequency signal is output to demodulator/FPLL 25.

Figure 5A:
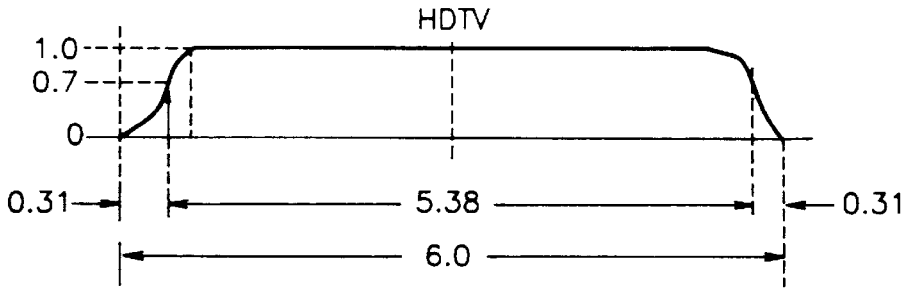
FIG. 5A is a frequency characteristic diagram of the VSB filter of FIG. 3.
Figure 5B:
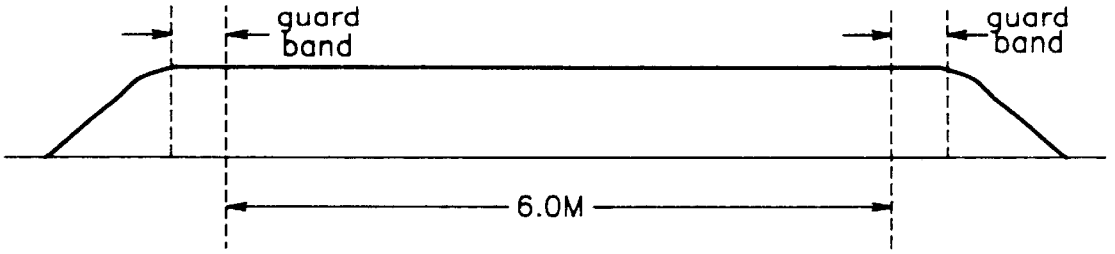
FIG. 5B is a frequency characteristic diagram of the SAW filter of FIG. 3.

The position of the pilot of the intermediate frequency signal input to demodulator/FPLL 25 is varied within 46.69 MHz±300 KHz so that SAW filter 21 must have a guard band by±300 KHz, as shown in FIG. 5B.

SAW filter 21 must be constructed with a band-rejection filter which has a guard band on both ends of the pass band of the VSB filter of FIG. 5A and has the frequency characteristic shown in FIG. 5B.

The guard band of SAW filter 21 is established at 300 KHz. The guard band can be also set by the maximum according to the difference between the frequency of the signal input via the antenna and the frequency of local oscillator 1b of tuner 20, that is, the oscillating frequency generated from the channel tuning signal and the frequency of local oscillator 23.

For instance, if the maximum of the difference between the frequency of the signal input from the antenna and the frequency of local oscillators 1b and 23 is 100 KHz, the guard band is 100 KHz.

For this reason, in the HDTV receiver of the present invention, the AFC signal output from demodulator/FPLL 25 does not control local oscillator 23 but local oscillator 24, shortening the loop. This stabilizes the system.

The baseband signal output from demodulator/FPLL 25 is VSB-filtered in VSB filter 26, which will be explained below.

Figure 6A:
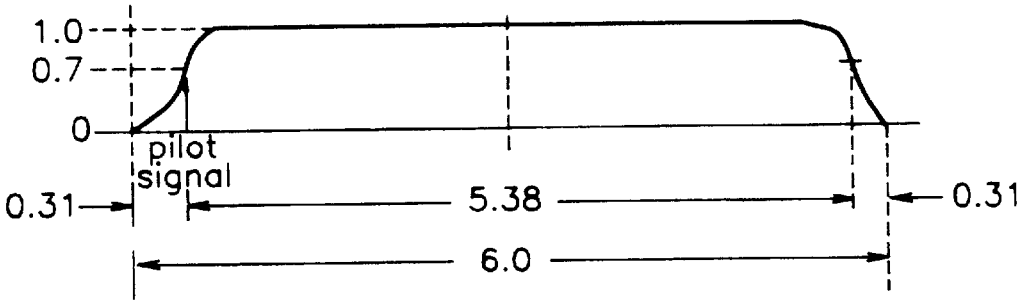
FIG. 6A is a frequency characteristic diagram of the VSB filter of FIG. 4.

VSB filter 26 has the frequency characteristic as shown in FIG. 6A. The position of the pilot signal is DC position so that the frequency characteristic is asymmetric centering on the DC.

Fourier-transforming this, a filter calculation value of a complex number with a real number and imaginary number is given as follows.

Provided that the filter calculation value of the complex number is C+jC, a filtered signal Y is $$\gamma = (I + jW\chi C + jC)$$

$$= \{IC_a - QC_I\} + i\{IC_I - QC_R\}$$

Out of the VSB-filtered signal, only the real-number portion is necessary. That is, only $IC_R - QC_1$, the real-number portion, is useful.

The I-channel signal A/D converted in ADC 11a is filtered in SRC filter 12a with the coefficient $C_R$ of the real-number axis. The Q-channel signal A/D converted in ADC 11b is filtered in SRC filter 12b with the coefficient $C_I$ of the imaginary-number axis.

In order to obtain finally VSB-filtered value $IC_R-QC_I$, signal $QC_I$ filtered in SRC filter 12b is subtracted from signal $IC_R$ filtered in SRC filter 12a in subtractor 13. This enables I-channel signal Î to be obtained.

Figure 6B:
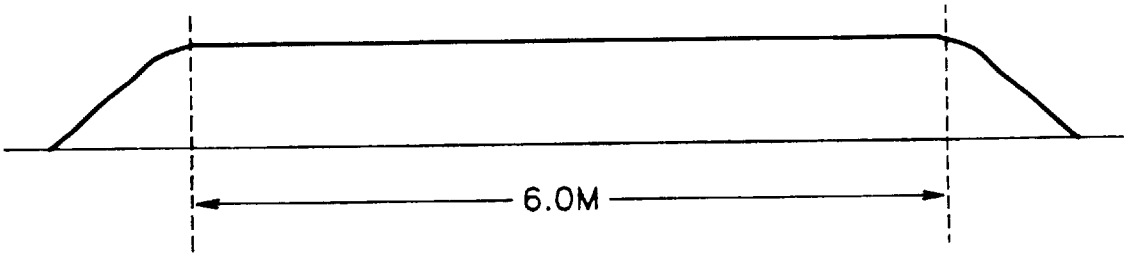
FIG. 6B is a frequency characteristic diagram of a SAW filter employing the VSB filter of FIG. 4.

Here, in a case when VSB filter 26 is connected to demodulator/FPLL 25, as shown in FIG. 6B, SAW filter 21 coupled to tuner 20 acts only as a band-rejection filter taking 6 MHz as its pass band including the transmission band of the VSB filter of FIG. 6A. Therefore, the roll-off factor $\alpha$ can be greater than 0.115.

In other words, as explained in FIGS. 5A and 5B, SAW filter 21 performs band-rejection-filtering, taking, as its pass band, a band in which the guard band is included in 6 MHz containing the transmission band of the VSB filter.

As described above, the present invention has the following advantages:

First, the VSB filter is realized with not a SAW filter but an FIR filter in the baseband, implementing an accurate filter.

Second, the SAW filter serves only as a band-rejection filter, reducing the number of taps and accordingly production cost.

Third, the oscillation loop is shortened to stabilize the system.

What is claimed is:

1. An HDTV receiver comprising:

a tuning portion for selecting one of a plurality of RF signals received, and converting a selected RF signal into an intermediate frequency signal;

a demodulator/FPLL for demodulating said intermediate frequency signal output from said tuning portion into a baseband signal in which the frequency and phase are locked, and outputting an AFC signal;

a first local oscillator receiving said AFC signal and forming a frequency signal which can be varied from a reference frequency to a specific frequency, and outputting the thus-formed frequency signal to said demodulator/FPLL; and a VSB filter for VSB-filtering said baseband signal output from said demodulator/FPLL.

2. An HDTV receiver as claimed in claim 1, wherein said tuning portion comprises:

a second local oscillator for outputting a fixed frequency signal;

a tuner for first demodulating one of a plurality of RF signals received according to an input channel tuning signal and a delayed AGC signal, and second demodulating said first demodulated RF signal according to a frequency signal output from said second local oscillator;

a SAW filter for band-rejection-filtering [a baseband] *the intermediate frequency* signal output from said tuner; and an IF amplifier for automatically gain-controlling said [baseband] *intermediate frequency* signal output from said SAW filter.

3. An HDTV receiver as claimed in claim 2, wherein said second local oscillator outputs a frequency signal fixed at 876 MHz.

4. An HDTV receiver as claimed in claim 2, wherein said SAW filter band-rejection-filters said [baseband] *intermediate frequency* signal output from said tuner through a frequency band containing a guard band with the transmission band of said VSB filter.

5. An HDTV receiver as claimed in claim 4, wherein said guard band is set by the maximum according to the difference between the oscillating frequency generated from the channel tuning signal and the frequency of said second local oscillator.

6. An HDTV receiver as claimed in claim 4, wherein said SAW filter band-rejection-filters said [baseband] *intermediate frequency* signal output from said tuner through 6 MHZ±300 KHz.

7. An HDTV receiver as claimed in claim 1, wherein said first local oscillator forms a frequency signal which can be varied from a 46.69 MHz reference frequency to±300 KHz according to the AFC signal output from said demodulator/FPLL, and outputting said thus formed frequency signal to said demodulator/FPLL.

8. An HDTV receiver as claimed in claim 1, wherein said VSB filter comprises:

an ADC portion for A/D converting said baseband signal output from said demodulator/FPLL by dividing said baseband signal into I-channel and Q-channel signals;

an SRC filter portion for SRC-filtering said I-channel and Q-channel signals output from said ADC portion; and a subtractor for subtracting a signal output from said SRC filter portion and outputting a VSB-filtered signal.

9. An HDTV receiver as claimed in claim 8, wherein said ADC portion consists of two first and second ADCs for A/D converting said I-channel and Q-channel signals, respectively.

10. An HDTV receiver as claimed in claim 8, wherein said SRC filter portion comprises:

an SRC filter for SRC-filtering said I-channel signal output from said ADC portion with the coefficient of the real-number axis; and an SRC filter for SRC-filtering said Q-channel signal output from said ADC portion with the coefficient of the imaginary-number axis.

11. An HDTV receiver as claimed in claim 9, wherein said first and second ADCs establish their sampling frequency at the symbol rate.

12. An HDTV receiver as claimed in claim 11, wherein said first and second ADCs have 10.76 MHz as their sampling frequency.

*13. A digital television receiver comprising:*

*a tuning portion, including*

*a fixed local oscillator providing a fixed frequency signal, and*

*a tuner receiving a channel tuning signal and the fixed frequency signal and in response thereto selecting one of a plurality of RF signals received, and converting a selected RF signal into an intermediate frequency signal;*

*a demodulator/FPLL for demodulating said intermediate frequency signal output from said tuning portion into a baseband signal in which the frequency and phase are locked, and outputting an AFC signal; and*

*a variable local oscillator receiving said AFC signal and forming a frequency signal which can be varied from a reference frequency to a specific frequency, and outputting the thus-formed frequency signal to the demodulator/FPLL.*

*14. A VSB receiving system for a digital television comprising:*

*a tuning portion including a tuner for selecting one of a plurality of signals received, and converting a selected*

*signal into an intermediate frequency signal, the tuning portion including a fixed local oscillator providing a first fixed frequency signal to the tuner;*

*a demodulator including an FPLL for demodulating said intermediate frequency signal output from said tuning portion into a baseband signal, the demodulator outputting an AFC signal; and*

*a variable local oscillator receiving the AFC signal and providing a frequency signal that can be varied from a reference frequency to a specific frequency and outputting a second frequency signal to the demodulator.*

*15. The VSB receiving system as claimed in claim 14, wherein said fixed local oscillator outputs a frequency signal fixed at 876 MHZ.*

*16. The VSB receiving system as claimed in claim 14, wherein said variable local oscillator forms a frequency signal which can be varied from a 46.69 MHZ reference frequency to +/−300 KHz according to the AFC signal output from said demodulator, and outputting said thus formed frequency signal to said demodulator.*

*17. A VSB receiving system for a digital television comprising:*

*a tuner selecting one of a plurality of signals received, and converting a selected signal into an intermediate frequency signal;*

*a fixed local oscillator providing a first fixed frequency signal to the tuner;*

*a filter receiving the intermediate frequency signal and performing a band pass filtering to produce a filtered signal;*

*an amplifier amplifying the filtered signal;*

*a demodulator including an FPLL for demodulating said filtered signal output from the amplifier and outputting an AFC signal; and*

*a variable local oscillator receiving the AFC signal and providing a frequency signal that can be varied from a reference frequency to a specific frequency and outputting a second frequency signal to the demodulator,*

*wherein the demodulator outputs a baseband signal.*

*18. The VSB receiving system as claimed in claim 17, wherein said fixed local oscillator outputs a frequency signal fixed at 876 MHZ.*

*19. The VSB receiving system as claimed in claim 17 wherein said variable local oscillator forms a frequency signal which can be varied form a 46.69 MHZ reference frequency to +/−300 KHz according to the AFC signal output from said demodulator, and outputting said thus formed frequency signal to said demodulator.*

*20. A method of processing a transmitted digital television signal at a VSB receiving system for a digital television, the method comprising the steps of:*

*selecting one of a plurality of signals received, and converting a selected signal into an intermediate frequency signal in response to a first fixed frequency signal generated from a fixed local oscillator;*

*generating an AFC signal in response to the intermediate frequency signal;*

*generating a second frequency signal that can be varied from a reference frequency to a specific frequency in response to the AFC signal; and*

*demodulating the intermediate frequency signal and generating a baseband signal from the intermediate frequency signal in response to the step of generating the second frequency signal.*

*21. The method of claim 20, wherein said first fixed frequency signal is 876 MHz.*

*22. The method of claim 20, wherein said second frequency signal can be varied from a 46.69 MHz reference frequency to +/−300 kHz according to the AFC signal.*

*23. A method for processing a transmitted digital television signal at a VSB receiving system for a digital television, the method comprising the steps of:*

*selecting through a tuner one of a plurality of signals received, and converting a selected signal into an intermediate frequency signal;*

*generating through a first fixed local oscillator a first fixed frequency signal to the tuner;*

*band pass filtering the intermediate frequency signal to produce a filtered signal;*

*amplifying the filtered signal;*

*demodulating the filtered signal output from the amplifier and generating an AFC signal;*

*generating a frequency signal that can be varied from a reference frequency to a specific frequency and outputting a second frequency signal to the demodulator; and*

*generating a baseband signal in response to the step of generating the frequency signal that can be varied.*

*24. The method of claim 23, wherein the first fixed frequency is 876 MHz.*

*25. The method of claim 23, wherein said second frequency signal can be varied from a 46.69 MHz reference frequency to +/−300 kHz according to the AFC signal.*

*26. A VSB receiving system for a digital television, comprising:*

*a tuning portion including a tuner for selecting one of a plurality of signals received, and converting a selected signal into an intermediate frequency signal, the tuning portion including a local oscillator providing a fixed frequency signal to the tuner, and further including an intermediate frequency filter for filtering said intermediate frequency signal to produce a filtered intermediate frequency signal;*

*a demodulator including an FPLL for demodulating said filtered intermediate frequency signal output from said tuning portion into a baseband signal, the demodulator outputting an AFC signal; and*

*a variable local oscillator receiving the AFC signal and providing a second frequency signal that can be varied from a reference frequency to a specific frequency to the demodulator.*

*27. The VSB receiving system as claimed in claim 26, wherein said first frequency signal is 876 MHZ.*

*28. The VSB receiving system as claimed in claim 26, wherein said variable local oscillator forms a frequency signal which can be varied from a 46.69 MHZ reference frequency to +/−300 KHz according to the AFC signal output from said demodulator, and outputting said thus formed frequency signal to said demodulator.*

*29. A VSB receiving system for a digital television, comprising:*

*a tuner selecting one of a plurality of signals received, and converting a selected signal into an intermediate frequency signal;*

*a local oscillator providing a fixed frequency signal to the tuner;*

*a SAW filter receiving the intermediate frequency signal and performing a band pass filtering to produce a filtered signal;*

*an amplifier amplifying the filtered signal;*

*a demodulator including an FPLL for demodulating said filtered signal output from the amplifier and outputting an AFC signal; and*

*a variable local oscillator receiving the AFC signal and providing a frequency signal that can be varied from a reference frequency to a specific frequency and outputting a second frequency signal to the demodulator,*

*wherein the demodulator outputs a baseband signal.*

*30. The method of claim 29, wherein said fixed frequency signal is 876 MHz.*

*31. The VSB receiving system as claimed in claim 29, wherein said variable local oscillator forms a frequency signal which can be varied from a 46.69 MHZ reference frequency to +/−300 KHz according to the AFC signal output from said demodulator, and outputting said thus formed frequency signal to said demodulator.*

*32. A method for processing a transmitted digital television signal at a VSB receiving system for a digital television, the method comprising the steps of:*

*selecting one of a plurality of signals received, and converting a selected signal into an intermediate frequency signal in response to a fixed frequency signal generated from a local oscillator, the selecting step including band pass filtering the intermediate frequency signal;*

*generating an AFC signal in response to the intermediate frequency signal;*

*generating a frequency signal that can be varied from a reference frequency to a specific frequency in response to the AFC signal and generating a second frequency signal; and*

*demodulating the intermediate frequency signal and generating a baseband signal from the intermediate frequency signal in response to the step of generating the frequency signal.*

*33. The method of claim 20, wherein said fixed frequency signal is 876 MHz.*

*34. The method of claim 32, wherein said second frequency signal can be varied from a 46.69 MHz reference frequency to +/−300 kHz according to the AFC signal.*

*35. A method for processing a transmitted digital television signal at a VSB receiving system for a digital television, the method comprising the steps of:*

*selecting through a tuner one of a plurality of signals received, and converting a selected signal into an intermediate frequency signal;*

*generating through a first local oscillator a fixed frequency signal to the tuner;*

*saw filtering the intermediate frequency signal to produce a filtered signal;*

*amplifying the filtered signal;*

*demodulating the filtered signal output from the amplifier and generating an AFC signal;*

*generating a second frequency signal that can be varied from a reference frequency to a specific frequency and outputting the second frequency signal to the demodulator; and*

*generating a baseband signal in response to the step of generating the frequency signal that can be varied.*

*36. The method of claim 35, wherein said fixed local oscillator outputs a frequency signal fixed at 876 MHz.*

*37. The method of claim 35, wherein said second frequency signal can be varied from a 46.69 MHz reference frequency to +/−300 kHz according to the AFC signal.*

*38. A VSB receiving system for a digital television, comprising:*

*a tuning portion including a tuner for selecting one of a plurality of signals received, and converting a selected signal into an intermediate frequency signal, the tuning portion including a local oscillator providing a first frequency signal to the tuner;*

*a first bandpass filter coupled to the tuner for receiving the intermediate frequency signal and outputting a bandpass filtered signal;*

*a second filter coupled to the first bandpass filter, the second filter including a VSB signal matching filter.*

*39. The VSB receiving system as claimed in claim 38, wherein said local oscillator outputs a frequency signal at 876 MHZ.*

*40. A VSB receiving system for a digital television receiver comprising:*

*a tuning portion including a tuner for selecting one of a plurality of signals received, and converting a selected signal into an intermediate frequency signal, the tuning portion including a local oscillator providing a first frequency signal to the tuner;*

*a first bandpass filter coupled to the tuner for receiving the intermediate frequency signal and outputting a bandpass filtered signal;*

*a demodulator coupled to the first bandpass filter and producing a baseband signal from the bandpass filtered signal; and*

*a second bandpass filter coupled to the demodulator, the second bandpass filter including a VSB signal matching filter.*

*41. The VSB receiving system as claimed in claim 40, wherein said local oscillator outputs a frequency signal at 876 MHZ.*

*42. A VSB receiving system for a digital television comprising:*

*a tuning portion including a tuner for selecting one of a plurality of signals received, and converting a selected signal into an intermediate frequency signal;*

*a filter having a guard band value (α), receiving the intermediate frequency from the tuner and performing a bandpass filtering to produce a filtered intermediate frequency signal;*

*a demodulator including an FPLL for demodulating said filtered intermediate frequency signal output from said filter into a baseband signal, the demodulator outputting an AFC signal; and*

*a variable local oscillator receiving the AFC signal and generating a frequency signal that can be varied from a reference frequency to a specific frequency corresponding to the guard band value (α) and outputting said frequency signal to the demodulator.*

*43. A VSB receiving system as claimed in claim 42, wherein said guard band value (α) is no greater than +/−300 kHz.*

*44. A VSB receiving system for a digital television comprising:*

*a tuner selecting one of a plurality of signals received, and converting a selected signal into an intermediate frequency signal;*

*a filter having guard band value (α), receiving the intermediate frequency signal and performing a band pass filtering to produce a filtered intermediate frequency signal;*

*an amplifier amplifying the filtered intermediate frequency signal;*

*a demodulator including an FPLL for demodulating the filtered intermediate frequency signal output from the amplifier and outputting an AFC signal; and*

*a variable local oscillator receiving the AFC signal and generating a frequency signal that can be varied from a reference frequency to a specific frequency corresponding to the guard band value (α) and outputting said frequency signal to the demodulator.*

*45. A VSB receiving system as claimed in claim 42, wherein said guard band value (α) is no greater than +/−300 kHz.*

*46. A method for processing a transmitted digital television signal in a VSB receiving system for a digital television, the method comprising:*

*selecting one of a plurality of signals received, and converting a selected signal into an intermediate frequency signal;*

*band pass filtering the intermediate frequency signal with a filter having a guard band value (α) and producing a filtered intermediate frequency signal;*

*generating an AFC signal in response to the filtered intermediate frequency signal;*

*generating a frequency signal that can be varied from a reference frequency to a specific frequency corresponding to the guard band value (α) in response to the AFC signal; and*

*demodulating the filtered intermediate frequency signal and generating a baseband signal from the filtered intermediate frequency signal in response to the step of generating the frequency signal.*

*47. The VSB receiving system as claimed in claim 46, wherein said guard band value (α) is no greater than +/−300 kHz.*

*48. A method for processing a transmitted digital television signal in a VSB receiving system for a digital television, the method comprising:*

*selecting through a tuner one of a plurality of signals received, and converting a selected signal into an intermediate frequency signal;*

*band pass filtering the intermediate frequency signal with a filter having guard band value (α), and producing a filtered intermediate frequency signal;*

*amplifying the filtered intermediate frequency signal;*

*demodulating the filtered intermediate frequency signal output from the amplifier and generating an AFC signal;*

*generating a frequency signal that can be varied from a reference frequency to a specific frequency corresponding to the guard band value (α) and outputting said frequency signal to the demodulator; and*

*generating a baseband signal in response to the step of generating the frequency signal that can be varied.*

*49. The VSB receiving system as claimed in claim 48, wherein said guard band value (α) is no greater than +/−300 kHz.*

*50. A VSB receiving system for a digital television receiver comprising:*

*a tuning portion including a tuner for selecting one of a plurality of signals received, and converting a selected signal into an intermediate frequency signal,*

*a first band pass filter having a guard band value (α) coupled to the tuner for receiving the intermediate frequency signal and outputting a bandpass filtered signal;*

*a demodulator coupled to the first band pass filter and producing a baseband signal from the bandpass filtered signal and;*

*a variable local oscillator receiving the AFC signal and generating a frequency signal that can be varied from a reference frequency to a specific frequency corresponding to guard band value (α) and outputting said frequency signal to the demodulator and;*

*a second band pass filter coupled to the demodulator, the second band pass filter including a signal matching filter.*

*51. The VSB receiving system as claimed in claim 50, wherein said guard band value (α) is no greater than +/−300 kHz.*

* * * * *